United States Patent [19]
Lang

[11] 3,976,837
[45] Aug. 24, 1976

[54] 360° VIEWING SYSTEM
[76] Inventor: Paul Wentworth Lang, P.O. Box 1000, Orange, Calif. 92666
[22] Filed: Mar. 19, 1975
[21] Appl. No.: 559,798

[52] U.S. Cl. .............................. 178/791; 178/6.8; 178/DIG. 1; 178/73 D; 178/6.5
[51] Int. Cl.² .................... H04M 9/54; H04M 1/00
[58] Field of Search ............ 178/73 D, 6.8, DIG. 1, 178/7.91, 6.5

[56] References Cited
UNITED STATES PATENTS
3,335,217  8/1967  Bassett ............................... 178/6.5

Primary Examiner—Howard W. Britton
Assistant Examiner—Edward L. Coles
Attorney, Agent, or Firm—Ralph B. Pastoriza

[57] ABSTRACT

A picture in the form of a print or projected image onto a rear view screen in a suitable mounting is positioned in a vertical plane and the mounting then rotated extremely rapidly about a vertical axis exactly bisecting the picture in the plane. With this arrangement, each person in an audience surrounding the mounting over 360° can view the picture each time the viewer's line of sight is normal to the plane of the picture so that, in effect, the entire audience regardless of their position over 360° can view the single picture simultaneously.

6 Claims, 3 Drawing Figures

360° VIEWING SYSTEM

This invention relates to a method and apparatus for enabling a single picture to be viewed substantially simultaneously by an audience surrounding the picture over 360°.

BACKGROUND OF THE INVENTION

Any display whether it be a picture print, a projection onto a screen, or a television image is best viewed when the viewer's line of sight is precisely normal to the plane of the picture. This ideal condition is difficult to realize where several people wish to view a picture simultaneously, unless the picture itself is extremely large.

One solution to the above problem is simply to mount the picture on a rotating pedestal which will slowly rotate over 360° permitting several people surrounding the pedestal to eventually view the picture in a line of sight normal to the plane of the picture. Such systems are oftentimes used in advertising displays in large areas such as railroad stations and the like. A problem with this arrangement is the fact that the rotation of the picture must be relatively slow in order to permit the various viewers to have an opportunity to study the picture. Such a slow rotation means that essentially only a few people at a time are viewing the picture and others out of the line of sight must wait until the picture comes into view.

There are many instances in which a plurality of people may wish to view a picture or displayed data simultaneously and continuously so that they can all carry on a meaningful discussion concerning the displayed information. For example, there may be 12 or 14 high level executives seated at a conference table around in a circle. If there were available a means centrally located on the table which would permit all of the persons present to examine a picture or projected data such as graphs or figures substantially simultaneously a great benefit would ensue. For example, the necessity of passing among the members of the group pictures to be successively viewed would be avoided as well as the possibility in the event a numer of duplicate pictures were provided of individual members looking at the pictures out of order rather than all viewing the same picture or data simultaneously.

BRIEF DESCRIPTION OF THE PRESENT INVENTION

With the foregoing in mind, the present invention contemplates a method and apparatus which essentially enables a single picture to be viewed by an audience or large number of persons wherein the picture is centrally located and the audience surrounds the picture over 360°.

Briefly, the method of the invention includes the steps of providing a support defining a flat surface in a vertical plane upon which the picture to be viewed is displayed and then rotating the support about a vertical axis which bisects the picture in the vertical plane, at a given number of revolutions per minute whereby any viewer in the audience will periodically have a line of sight normal to the plane of the picture and thereby will be able to view the picture.

By making the revolutions per minute exceed 900, each member of the audience essentially views the picture simultaneously and continuously.

A preferred apparatus for carrying out the method includes a mounting means defining the flat surface lying in a vertical plane upon which the picture to be viewed is displayed together with a motor means for rotating the mounting means about a vertical axis which exactly bisects the picture in the vertical plane. The rotational rate in revolutions per minute is sufficiently great that in effect all viewers surrounding the mounting means over 360° will see the same picture substantially simultaneously.

Modifications of the basic structure permit the picture to be in the form of a print simply affixed to the flat surface or alternatively the flat surface can comprise a rear view projection screen and a picture, for example, a microfisch film projected thereon or even a television tube picture projected thereon.

BRIEF DESCRIPTION OF THE DRAWINGS

A better understanding of this invention will be had by referring to the accompanying drawings in which.

DETAILED DESCRIPTION OF THE INVENTION

Figure 1:
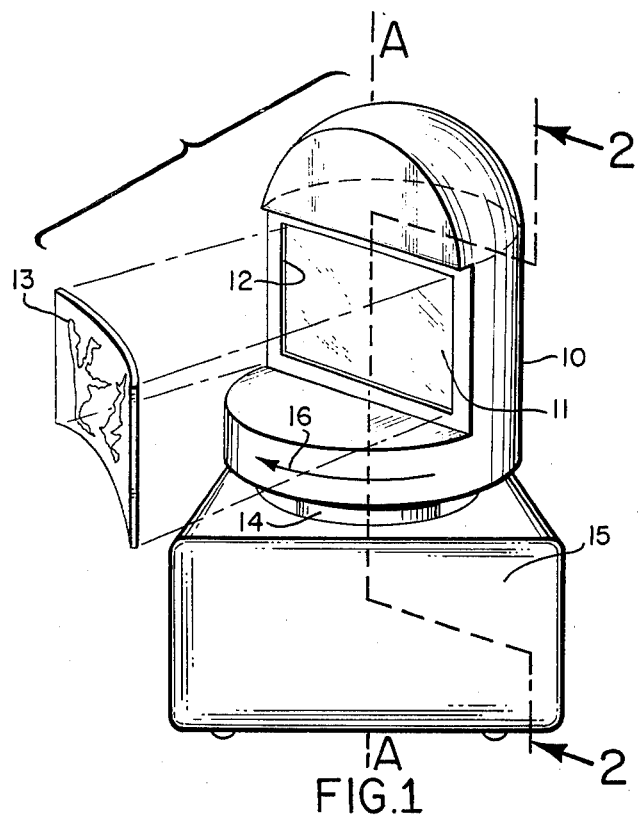
FIG. 1 is a perspective view of a first embodiment of a 360° viewing apparatus in accord with the present invention.

Referring first to FIG. 1, there is shown a mounting means 10 defining a flat surface 11 lying in a vertical plane upon which a picture to be viewed is displayed. By way of example, in FIG. 1, the marginal portion of the flat surface 11 includes a securing flange 12 arranged to receive and secure a picture print 13 shown exploded away from the surface.

The mounting means 10 includes a hollow vertical shaft 14 shown extending into a housing 15. As will be clearer as the description proceeds, means are provided in housing 15 for rotating the shaft 14 and mounting means 10 about a vertical axis A—A at a given number of revolutions per minute, the rotation being indicated by the arrow 16.

A critical and essential feature of this invention is the fact that the vertical axis A—A must precisely bisect the flat surface 11 upon which the picture is displayed in the vertical plane. By assuring that rotation of the picture takes place about this axis, the center of the picture will always be at a constant distance from the viewer's eyes while one half of the picture, for example, to the left of the axis A—A is moving away from the viewer at the same rate that the other half, for example, to the right of the axis A—A is moving towards the viewer.

When the foregoing conditions are met and the mounting means is rotated at a speed greater than 900 revolutions per minute, each viewer in a circle surrounding the mounting means will see the picture periodically at the precise moment the viewer's line of sight is normal to the plane of the picture. Because of the rapid rotation, all of the viewers over the entire 360° can in effect view the same picture substantially simultaneously.

Figure 2:
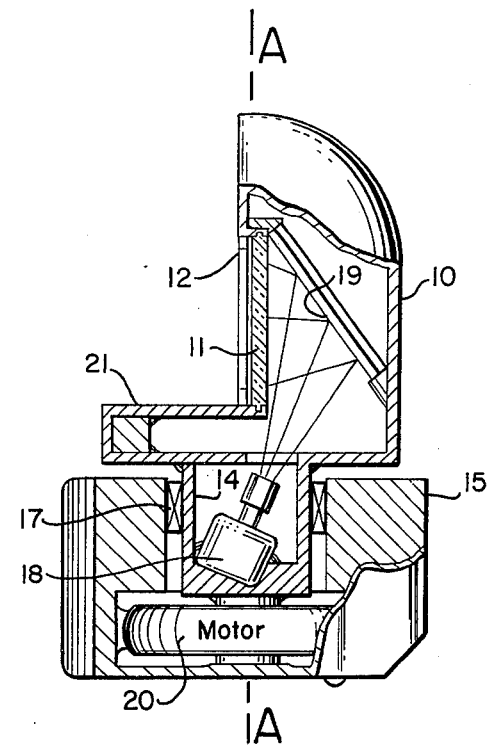
FIG. 2 is a broken away side view partly in cross section taken in the direction of the arrows 2—2 of FIG. 1; and, FIG. 3 is a perspective view partly diagramatic in form of a modified version of the invention.

Referring now to FIG. 2, it will be noted that the apparatus described in FIG. 1 is also capable of displaying a picture on the flat surface 11 by a rear projection means if desired. Thus, as shown in FIG. 2, the flat surface 11 may comprise a rear projection screen. The hollow shaft 14 is rotatably mounted in the housing 15 as by bearings 17 and secured to the mounting means 10 to rotate the same about the vertical axis A—A. As shown, this hollow shaft incorporates a projector 18, the mounting means itself including a light guiding means such as a mirror 19 for projecting a picture in the projector onto the rear projection screen 11 to provide the particular picture to be viewed.

In FIG. 2, there is shown in the housing 15 a motor 20, connected to rotate the hollow shaft 14 about the vertical axis A—A. It will be appreciated that the projector 18, mirror 19 and rear projection screen 11 are all rotated simultaneously with the shaft and mounting means so that the picture remains stationary relative to the rear projection screen for every rotational position of the mounting means.

In order to assure dynamic balancing of the mounting means 10 about the rotational axis A—A, suitable counterweight means such as indicated at 21 may be provided in the mounting means 10.

It will be understood in FIG. 2 that access may be had to the projector through the mounting means 10 by removing the rear projection screen 11. Alternatively, suitable access openings (not shown) may be provided in the hollow shaft 14. The picture projected by the projector 18 may be of any desired type, such as a conventional colored slide or alternatively microfisch film data.

Figure 3:
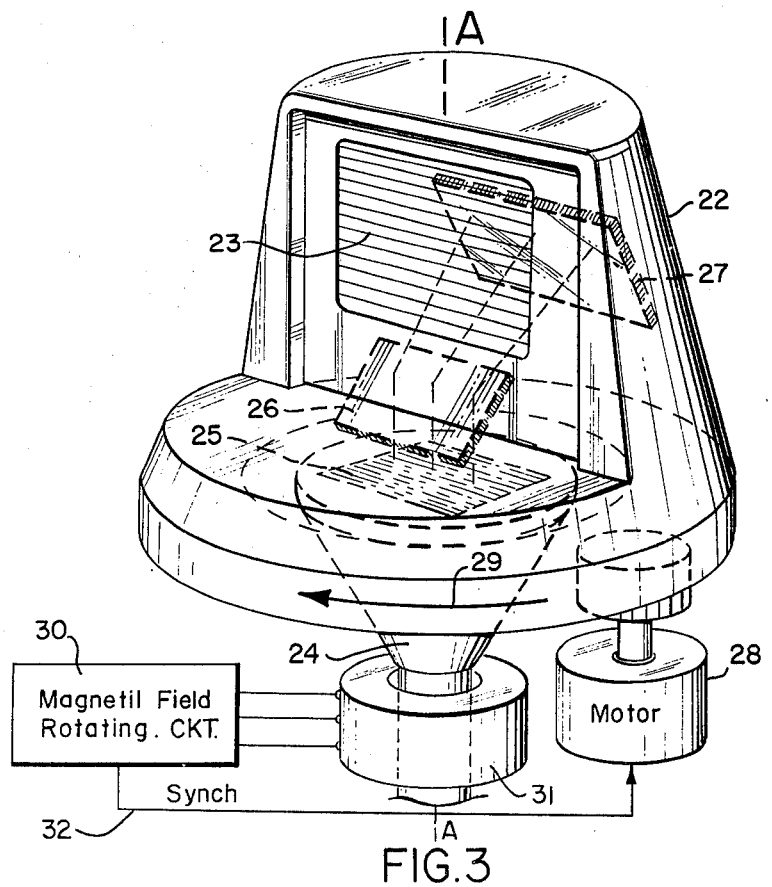

Referring now to FIG. 3, there is shown a modified version of the apparatus wherein a television picture can be viewed substantially simultaneously by persons forming a ring about the picture to be viewed over 360°. As in the case of FIG. 1, there is provided a mounting means 22 defining a flat surface 23 lying in a vertical plane. This flat surface 23 comprises a rear projection screen and is arranged to be rotated with the mounting means 22 about a vertical axis A—A which precisely bisects the screen 23 in the vertical plane.

A television picture tube 24 is positioned below the screen to face upwardly in a vertical direction coaxial with the axis A—A. An image or picture on the face of the television tube 24 is schematically indicated at 25. A first mirror 26 is secured in the mounting means 22 vertically above the picture tube and angulated to reflect the image 25 on the tube away from the vertical axis A—A. A second mirror 27, in turn, is carried in the mounting means 22 in a position to the rear of the screen 23 and is angulated in a manner to reflect the image from the first mirror 26 onto the screen 23 to provide the picture to be viewed.

In the embodiment of FIG. 3, the mounting means 22 together with the first and second mirrors 26 and 27 and rear projection screen 23 are all rotated simultaneously about the axis A—A independent of the television picture tube 24. For this purpose, there is schematically illustrated a motor 28 which may be coupled to the mounting 22 as by an internal ring gear (not shown). The direction of rotation in FIG. 3 of the mounting means 22 is indicated by the arrow 29.

In order that the image displayed on the screen 23 remains stationary relative to the screen, it is essential that the image 25 be rotated simultaneously with the mirrors and mounting means 22. While such rotation could be accomplished by simply rotating the entire television picture tube 24 about its axis, a preferable solution is to simply rotate the image 25 on the face of the tube electronically.

In accord with the present invention, the image 25 can be electronically rotated on the face of the tube by simply rotating the magnetic field controlling the picture tube electron beam by a suitable magnetic field rotating circuit indicated by the block 30 connecting to the magnetic yoke 31 for the television tube. In this respect, it is essential to synchronize the electronic rotation of the image 25 with the rotation of the housing means 22 and towards this end, there is shown a synchronizing line 32 connecting from the magnetic field rotating circuit 30 to the motor 28.

OPERATION

In operation, the apparatus described is simply placed in a central location such as on top of a conference table about which are seated a number of persons who wish to view a picture. A single picture print or other data such as described in FIG. 1 at 13, may be secured to the flat surface 11 or alternatively, a picture or data may be projected onto the screen as described in conjunction with FIG. 2. In the case of FIG. 3 a complete television program or televised data derived by optically scanning microfisch film or other physical images and converting the same to electronic signals for the television picture tube can be displayed.

In all three cases, the mounting means is rapidly rotated preferably at a rate greater than 900 revolutions per minute, the result being that each viewer of the picture will see it clearly and distinctly each time that it is normal to his line of sight so that in effect, the entire group of gathered persons can view the same picture simultaneously.

The present invention thus fulfills a need not heretofore available.

What is claimed is:

1. A method of presenting a television picture to an audience in which the picture is centrally located and the audience surrounds the picture over 360°, comprising the steps of:
   a. providing a support defining a flat surface in a vertical plane upon which said picture is displayed;
   b. rotating said support about a vertical axis which bisects said picture in said vertical plane, at a given number of revolutions per minute; and
   c. electronically rotating said television picture at said given number of revolutions per minute whereby any viewer in said audience will periodically have a line of sight normal to said plane and thereby will be able to view said picture.

2. The method of claim 1, in which said revolutions per minute exceed 900.

3. A 360° viewing apparatus comprising, in combination:
   a. a mounting means defining a rear projection screen lying in a vertical plane upon which a picture to be viewed is displayed; and
   b. means for rotating said mounting means including a vertical hollow shaft secured to the mounting means and a motor means connected to the shaft to rotate said shaft at a given number of revolutions per minute; a projector secured within said shaft; and light guiding means in the mounting means for projecting a picture in said projector onto said rear projection screen to provide said picture to be viewed, said projector, light guiding means and rear projection screen all rotating simultaneously with said shaft and mounting means so that said picture remains stationary relative to said screen for every rotational position of said mounting means, whereby a plurality of viewers forming a ring around said mounting means will each see said picture a number of times every minute corresponding to said given number of revolutions per minute when their line of sight is normal to said picture, the given number of revolutions per minute being sufficient that in effect all viewers see this same picture substantially simultaneously.

4. An apparatus according to claim 3, in which said light guiding means comprises a mirror in said mounting means disposed to the rear of said rear projection screen.

5. An apparatus according to claim 3, in which said mounting means includes counterweight means for dynamically balancing said mounting means about said vertical axis.

6. A 360° viewing apparatus comprising, in combination:
   a. a mounting means defining a rear projection screen lying in a vertical plane upon which a picture to be viewed is displayed; and
   b. means for rotating said mounting means about a vertical axis which exactly bisects said picture in said vertical plane, at a given number of revolutions per minute;

a T.V. picture tube facing vertically upwardly coaxial with said vertical axis in a position below said screen; a first mirror carried in said mounting means vertically above said picture tube and angulated to reflect the image on said tube away from said vertical axis; a second mirror carried in said mounting means positioned to the rear of said screen and angulated to reflect the image from said first mirror onto said screen to provide said picture to be viewed, said means for rotating said mounting means comprising motor means connected to the mounting means so that said mirrors and screen are also rotated relative to said T.V. picture; and electronic means for rotating the image on the face of said T.V. tube in its own plane about said vertical axis, said electronic means being synchronized with said motor means so that said image is rotated in precise synchronism with the rotation of said mounting means whereby a plurality of viewers forming a ring around said mounting means will each see said picture a number of times every minute corresponding to said given number of revolutions per minute when their line of sight is normal to said picture, the given number of revolutions per minute being sufficient that in effect all viewers see the same picture substantially simultaneously.

* * * * *